(12) United States Patent
Miyajima et al.

(10) Patent No.: US 6,345,601 B1
(45) Date of Patent: Feb. 12, 2002

(54) DIRECT INJECTION FUEL INJECTOR AND INTERNAL COMBUSTION ENGINE MOUNTING THE SAME

(75) Inventors: Ayumu Miyajima, Chiyoda; Yoshio Okamoto, Minori; Yuzo Kadomukai, Ishioka; Shigenori Togashi, Abiko; Tohru Ishikawa, Kitaibaraki, all of (JP)

(73) Assignee: Hitachi, Ltd., Tokyo (JP)

( * ) Notice: Subject to any disclaimer, the term of this patent is extended or adjusted under 35 U.S.C. 154(b) by 6 days.

(21) Appl. No.: 09/620,584

(22) Filed: Jul. 20, 2000

(30) Foreign Application Priority Data

Dec. 15, 1999 (JP) .............................. 11-355501

(51) Int. Cl.[7] ...................... F02M 51/06; F02M 61/18
(52) U.S. Cl. ................... 123/305; 123/472; 239/467; 239/483; 239/533.12
(58) Field of Search ......................... 123/295, 305, 123/472; 239/467, 483, 533.12

(56) References Cited

U.S. PATENT DOCUMENTS

| | | | |
|---|---|---|---|
| 4,011,996 A | * 3/1977 | Tsuji et al. ................. | 239/467 |
| 4,434,766 A | * 3/1984 | Matsuoka et al. .......... | 123/472 |
| 4,971,254 A | * 11/1990 | Daly et al. ............... | 239/533.12 |
| 6,105,883 A | * 8/2000 | Takeda et al. ........... | 239/533.12 |
| 6,109,543 A | * 8/2000 | Bright et al. ........... | 239/533.12 |
| 6,179,227 B1 | * 1/2001 | Ren et al. .................... | 239/483 |
| 6,206,304 B1 | * 3/2001 | Koseki et al. .......... | 239/533.12 |

FOREIGN PATENT DOCUMENTS

| JP | 6146886 | 5/1994 |
|---|---|---|
| JP | 842427 | 2/1996 |

* cited by examiner

*Primary Examiner*—Erick Solis
(74) *Attorney, Agent, or Firm*—Antonelli, Terry, Stout & Kraus, LLP

(57) ABSTRACT

In a spray characteristic in a direct injection system gasoline engine use electromagnetic system fuel injector, to a piston cavity a mixture of fuel and air having a combustible concentration is converged and making rich the mixture having the combustible concentration at a side of ignition plug, then an ignition performance is improved and making thin the mixture of fuel and air to a piston direction a combustion performance is improved, namely it is necessary to generate a flat inclined spray. A part of a wall face for forming the injection hole at an outlet portion of the injector is formed with V groove according to two inclination faces with optional angles against a center axial line of the injection hole or a substantially recess shape step-wise rectangular groove having different cut-off depths.

8 Claims, 11 Drawing Sheets

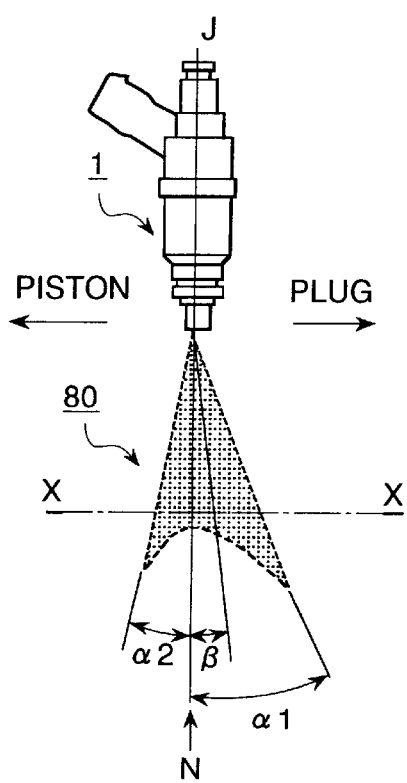
FIG. 3A
FIG. 3B
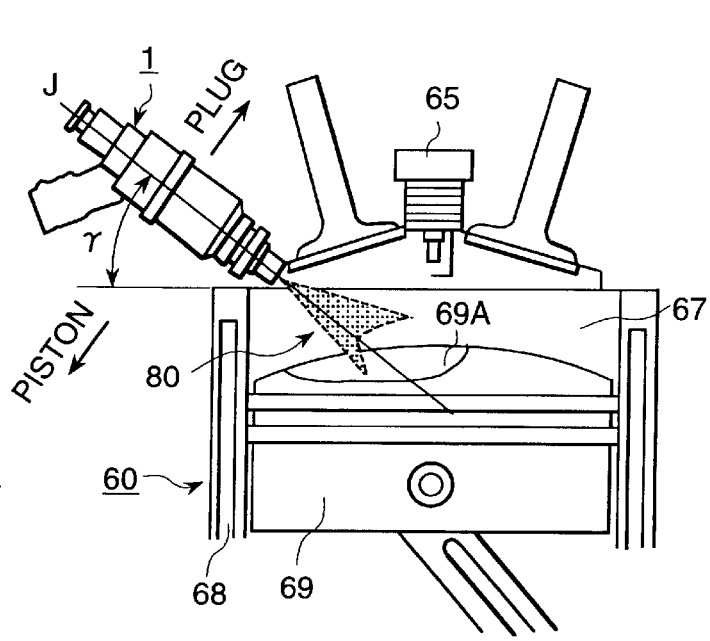
FIG. 3C

FIG. 7A
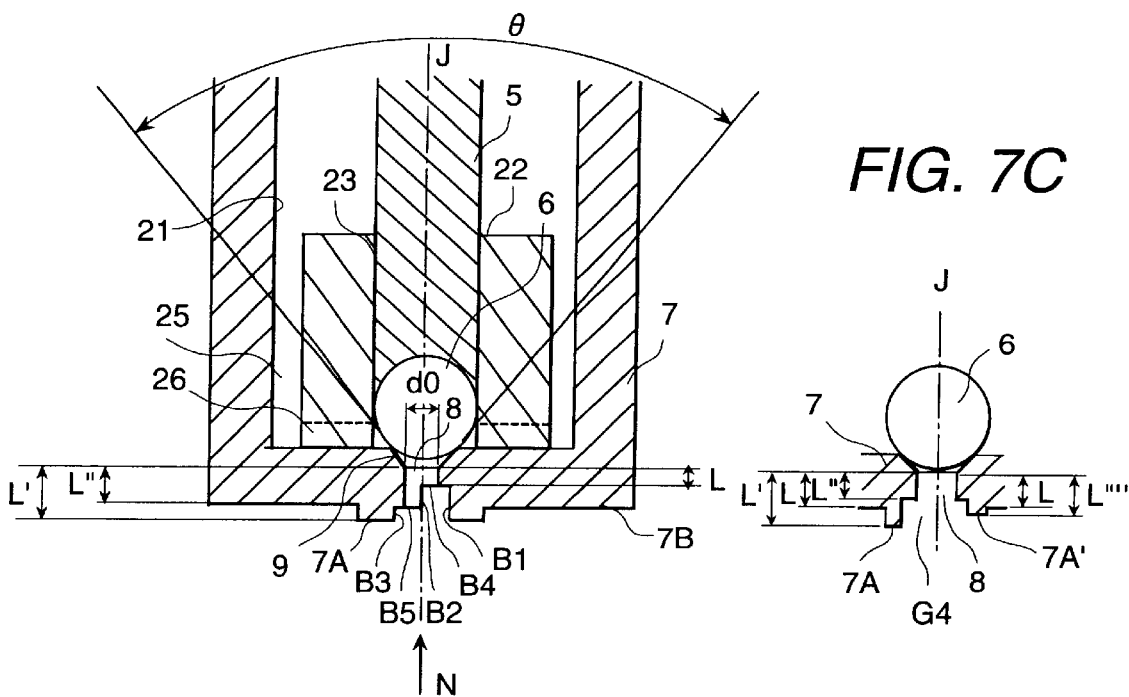
FIG. 7C
FIG. 7B
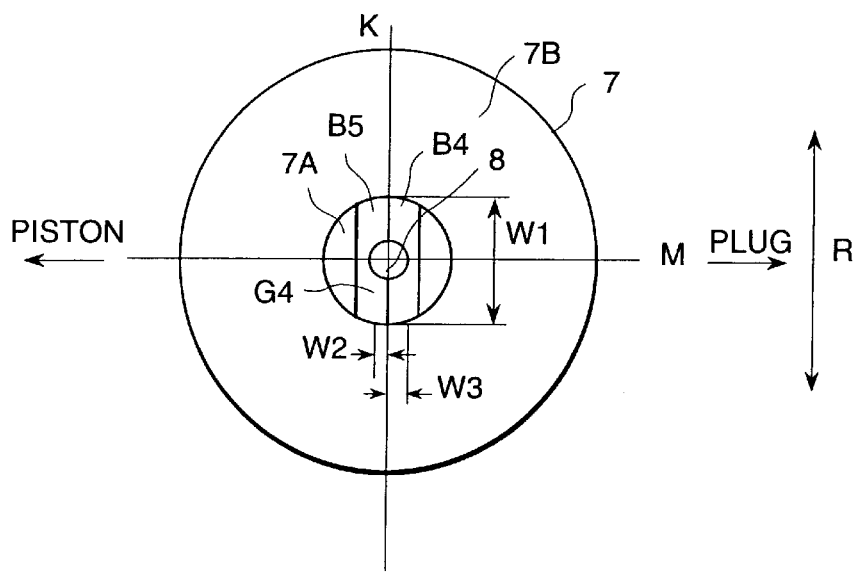

DIRECT INJECTION FUEL INJECTOR AND INTERNAL COMBUSTION ENGINE MOUNTING THE SAME

BACKGROUND OF THE INVENTION

The present invention relates to a direct injection type of fuel injector and, an internal combustion engine mounting a direct injection type of fuel injector; and, more particularly, the invention relates to a fuel injector for forming a fuel spray having a superior ignition property and a superior combustion property, and an internal combustion engine on which the fuel injector is mounted. The invention also relates to a fuel swirl type injector structure for injecting fuel directly into a combustion chamber-of a direct injection, fuel injector type, internal combustion engine, and an internal combustion engine on which the fuel injector is mounted.

In contrast to a fuel injection apparatus of the type which is used to inject fuel into an air intake conduit of an internal combustion engine, there is also a direct injection type of fuel injection apparatus by which fuel is injected directly into a combustion chamber of the engine.

An example of a direct injection gasoline internal combustion engine is disclosed in Japanese application patent laid-open publication No. Hei 6-146886. In this document, a construction is described in which, by taking into consideration the installation position of the fuel injector relative to an air intake port in an upper portion of the cylinder, a longitudinal swirl air intake flow (a tumble flow) from an air intake opening is produced in a combustion chamber, and by using a fuel thinner than a theoretical mixture of fuel and air, a lean-burn combustion can be carried out stably and fuel consumption can be improved.

Further, Japanese application patent laid-open publication No. Hei 8-42427 discloses a fuel injector in which an orifice edge of a nozzle member is formed with a two-dimensional curved face which is perpendicular to a valve body axial line so that a flat spray having an elliptical cross-sectional shape is generated, whereby fuel adhesion to the air intake valve is restrained.

In the above-stated publications, full consideration has not been given to the spray shape or the injection structure, to the extent that both the ignition property (a spark property) and the combustion property (an unburned gas discharge amount reduction) can be improved. Namely, a full examination has not been made concerning the means for generating a spray having a cross-sectional shape which is adapted to the cylinder piston shape and cavity shape in the engine, under a state where rough particles in the spray are reduced.

To optimize the spray which is injected by a fuel injector, it is necessary to take into consideration the following characteristics or properties of the spray. A first characteristic relates to the spray shape and spray spreading angle, and the distance the spray reaches. A second characteristic relates to the spray particle diameter. In this regard, it is necessary to improve the uniformity of the spray particle diameter distribution to reduce the number of large diameter particles in the spray as soon as possible. A third characteristic relates to the spray structure. In this regard, it is necessary to produce a proper spatial distribution of the sprayed fuel particles in the combustion chamber.

SUMMARY OF THE INVENTION

The inventors of the present invention have studied how the above-stated spray properties relate to the combustion property of the internal combustion engine according to experimental analysis, and the following facts have been made clear. To effect an improvement in the ignition property, it is effective to locate the major part of the fuel particle distribution in the vicinity of the spark plug and to make the air-fuel distribution high in the spark plug direction.

In addition, when the fuel particle distribution in the piston direction is lessened, there is a tendency for unburned gas components (HC, CO) in the fuel to be reduced, so that the combustion property is improved.

An object of the present invention is to provide a direct injection type of fuel injector and an internal combustion engine on which the fuel injector is mounted, wherein a fuel spray which results in a reduced discharge amount of unburned gas components can be formed.

To attain the above-stated object, according to the present invention, at an orifice edge of a nozzle member of a fuel injector, a constriction of the spray flow is opened partially. At the injector nozzle, a center axial line of the orifice and a flat face in parallel to the center axial line of the fuel injector serves as a boundary, and, at one side of the boundary, the spray amount is large, and at the other side of the boundary, the spray amount is small, whereby the spray angle is large in a direction parallel to the flat face and the spray angle is small in a direction transverse to the flat face, namely a flat inclined spray is formed.

More specifically, to a nozzle end face in which an outlet opening face of the orifice is formed, a V-groove is formed by two faces which incline at an optional angle relative to the center axial line of the orifice, or a substantially recess-shaped step-wise rectangular groove having different cut-off depths is formed.

As a result, in the groove direction, the constriction of the spray flow can be opened, so that at a side of a large inclination angle or a side of a rectangular groove having a deep cut-off depth, the spray amount is large, but at a side of a small inclination angle or a side of a rectangular groove having a shallow cut-off depth, the spray amount is small, namely a flat inclined spray is formed.

To allow the spray to directly reach the ignition device, or to reach the ignition device as a result of the induction produced by a cavity which is formed on the piston, the spray angle can be adjusted; and, accordingly, it is possible to obtain a good ignition property in the internal combustion engine and to reduce the discharge amount of unburned gas components of combustion.

BRIEF DESCRIPTION OF DRAWINGS

FIG. 3A is a diagram showing a spray structure of a spray produced by the injector of FIG. 1 in relationship to an engine cylinder;

FIG. 3B is a cross-sectional view of a spray produced by the fuel injector of FIG. 1 in which fuel is injected to the atmosphere;

FIG. 3C is a side sectional view schematically showing an internal combustion engine in which fuel is directly injected into a combustion chamber;

FIG. 7A is a longitudinal cross-sectional view showing an electromagnetic system fuel injector of another embodiment according to the present invention;

FIG. 7B is a plan view of the nozzle portion;

FIG. 7C is a longitudinal cross-sectional view of another nozzle member;

DESCRIPTION OF THE INVENTION

Figure 1:
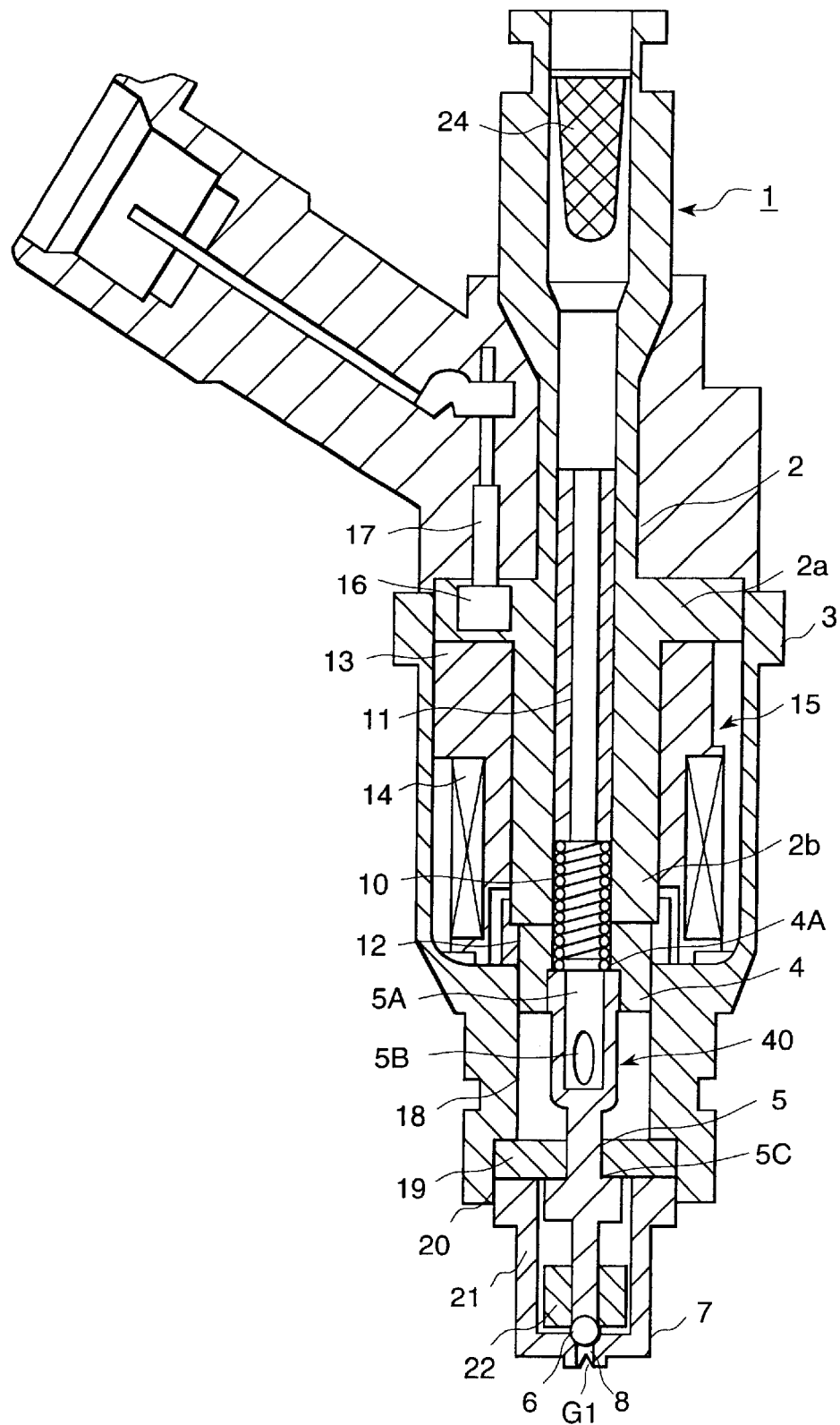
FIG. 1 is a cross-sectional view showing an electromagnetic system fuel injector representing one embodiment according to the present invention.

A direct injection fuel injector and an internal combustion engine on which the fuel injector is mounted, according to a first embodiment of the present invention, will be explained with reference to from FIG. 1 to FIG. 6B. FIG. 1 shows a longitudinal cross-sectional view of an electromagnetic type fuel injector 1 according to the present invention. Using this figure, the structure and operation of the electromagnetic type fuel injector 1 will be explained.

The electromagnetic fuel injector 1 injects fuel by carrying out an opening and closing of a fuel orifice in a seat portion in response to an ON-OFF signal having a duty ratio which is controlled by a control unit. A magnetic circuit is comprised of a yoke 3; a core 2 which comprises a plug body portion 2a for closing an open end of the yoke 3 and a pillar-shaped portion 2b which extends in a central portion of the yoke 3; and an anchor 4 which is interposed between the end of the portion 2b and the yoke 3 to form an air gap in the magnetic circuit.

At the longitudinal center of the pillar-shaped portion 2b, a passage 4A is provided, and this passage holds a spring member 10 which presses one end of a valve body 40 against a seat face 9. The valve body 40 is comprised of the anchor 4, a rod 5 and a ball member 6, and the seat portion is provided at an upstream side of a fuel injector 8 which is formed in a nozzle member 7 and permits a passage of the fuel. An upper end of the spring member 10 is in contact with a lower end of a spring adjuster 11, which adjusts a set load and passes through the center of the core 2.

A sealing ring 12 surrounds a gap portion which is disposed between a side of the pillar-shaped portion 2b of the core 2 and a side of the valve body 40 of the yoke 3, so as to prevent an outflow of the fuel toward a coil 14, and this sealing ring 12 is fixed mechanically between both members.

The coil 14 for exciting the magnetic circuit is wound around a bobbin 13 and the outer periphery thereof is molded using a plastic material.

A terminal 17 of a coil assembly body 15, being comprised of the above stated members, is inserted into a hole 16 which is provided on an annular projecting portion 2a of the core 2. This terminal 17 is connected with a terminal of the control unit (not shown in the figure).

The yoke 3 has an anchor receiving portion 18 in which the valve body 40 is disposed, and a nozzle receiving portion 20 for having a larger diameter than the diameter of the anchor receiving portion 18 for accommodating a stopper 19 and the nozzle member 7 which forms a tip end of the injector. The valve body 40 is comprised of an anchor 4 made of a magnetic material, a rod 5, one end of which is formed integrally with the anchor 4, and a ball member 6, which is disposed at a tip end portion of the rod 5. At a side in contact with the anchor 4, the rod 5 has a hollow portion 5A for permitting the fuel to pass through, and in this hollow portion 5A, there is an outflow port 5B to permit fuel to flow out and into the chamber formed by the anchor receiving portion 18.

Further, in the valve body 40, the outer periphery of the anchor 4 is in contact with the sealing ring 12 and is movable in an axial direction thereof guided by the inner wall of the anchor receiving portion. Further, the ball member 6 is guided by an inner peripheral face 23 of a fuel swirl element 22 which is inserted into an inner hollow portion of the nozzle member 7. In the nozzle member 7, the fuel swirl element 22 also serves to guide an end portion of the rod 5 to which the ball member 6 is joined, and a seat face 9 in which the ball member is seated is formed in the lower inner face of the nozzle member 7. At a central portion of the lower end of the nozzle member 7, downstream of the seat face 9, a fuel injector nozzle 8 for permitting the fuel to pass through is provided.

The stroke (amount of movement in an axial direction in FIG. 1) of the valve body 40 is set to a dimension determined by the size of an air gap between a receiving face 5C of a neck portion of the rod 5 and the stopper 19. At the upper end of the injector, a filter 24 is provided to prevent the entrance of dust and foreign matter in the fuel and in the fuel passage which extends to the valve seat between the ball valve 6 and the seat face 9.

Figure 2A:
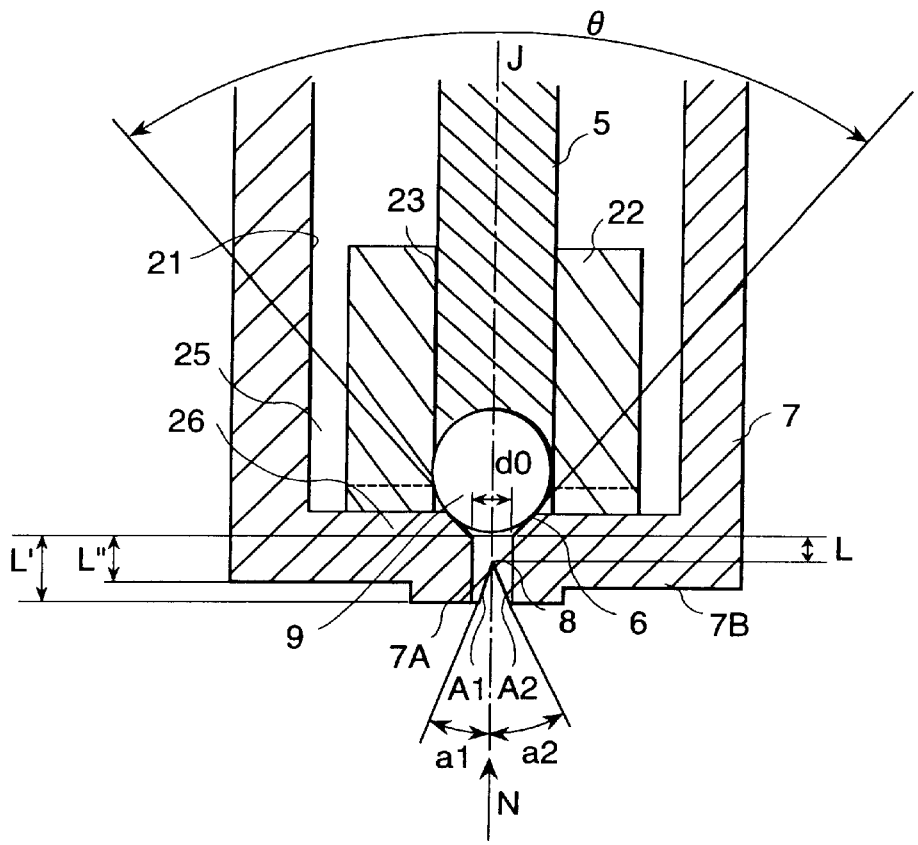
FIG. 2A is an enlarged sectional view showing a nozzle portion of the electromagnetic system fuel injector of FIG. 1.
Figure 2B:
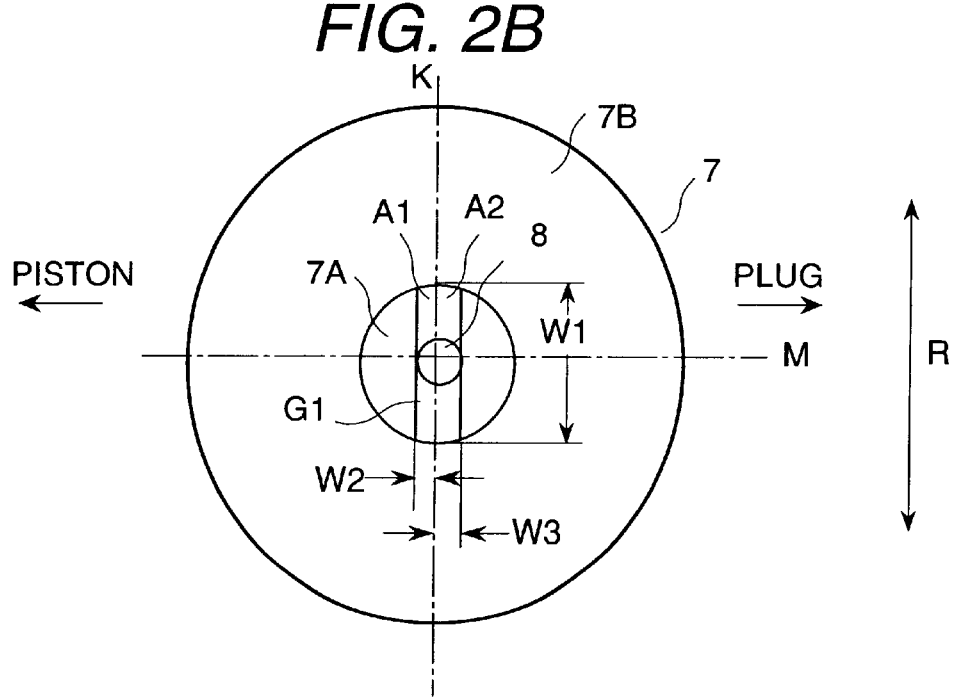
FIG. 2B is a plan view of the nozzle member portion of FIG. 2A taken from an arrow N direction.

Next, referring to FIG. 2A and FIG. 2B, the nozzle member 7, in which V groove G1 (a groove G1 formed by two inclined faces having optional angles) is provided in this embodiment according to the present invention, will be explained. FIG. 2A shows an enlarged longitudinal sectional view of the nozzle member 7 of the electromagnetic type fuel injector 1, and FIG. 2B is a plan view of the nozzle member 7 of FIG. 2A as seen from the direction of arrow N.

In the fuel injector nozzle 8, the center of the fuel orifice is coincident with an axial line (a valve axial center) J of the valve body, and a wall face of the orifice is formed in parallel with the axial line (the valve axial center) J of the valve body, the orifice having a diameter of d0.

Further, the seat face 9 of the nozzle member 7 is formed to have a seat angle of θ and a bottom of the nozzle member 7 is constituted by a surface 7B which extends in a direction orthogonal to the axial line J and has a central projecting portion 7A. In the V groove type faces A1 and A2 of the projecting portion 7A aligned with the wall face of the fuel injection hole 8, fuel injection hole outlet faces thereof are formed to have inclination angles of a1 and a2 relative to the axial line (the valve axial center) of the valve body 40 and a center axis (in the fuel injection direction) of the fuel injection hole 8. In FIG. 2B, the length of the V groove G1 is designated W1.

As seen in FIG. 2A, the total orifice length from the bottom of the seat face to the surface of projection 7A, is L', and the orifice length of a non-cut-off portion is L. The tip end of the central projecting portion 7A of the nozzle member 7 is formed with one plan face orthogonal to the axial line J and two inclined faces connecting to this plan face and forming a transverse groove extending across the orifice 8 at the outlet end.

In this embodiment according to the present invention, the central projecting portion 7A forms the outlet portion of the fuel injection hole 8 at the tip end of the nozzle member 7, however it is not necessary to provide the projection portion 7A. In a structure in which the projection portion 7A is not provided, the total orifice length is L". In this case, the size relation of the orifice length becomes L'>L">L. However, by the provision of the projection portion 7A, in spite of the weight increase caused by the projection portion 7A, large inclination angles of a1 and a2 can be achieved.

Further, in this embodiment according the present invention, as opposed to the case where the tip end face of the nozzle member 7 is formed with a flat face, by the provision of the projection portion 7A, both this projection portion 7A and the cut-off depth can be adjusted, between the minimum orifice length L" and the maximum orifice length L', so that the required inclination angles of a1 and a2 can be realized.

On the other hand, without the provision of the projection portion 7A only the cut-off depth can be adjusted; namely, by adjusting only the orifice length L, the necessary inclination angles of a1 and a2 can not be realized. Further, the cut-off portion is provided mainly in the projection portion 7A, and within a range from the maximum orifice length L' to the minimum orifice length L", the inclination angles of a1 and a2 can be constituted.

Further, the groove length W1 is not limited to the projection portion 7A, but the V groove G1 can be extended to the bottom face 7B. In this case, the degree of features of the spray can be strengthened in the direction of arrow R.

In V groove G1 in this embodiment according to the present invention, to the tip end face (the nozzle tip end face) of the projection portion 7A, in which the outlet opening face of the fuel injection hole 8 is formed, the groove portion is formed to extend to both sides of the outlet opening, including the outlet opening. Further, in V groove G1, within the distance from the center axis line of the fuel injection hole 8 to both side walls for forming the groove, one distance W3 ("PLUG" side) is formed so as to be longer than the distance W2 ("PISTON" side) (W3>W2).

To illustrate the manner of installation of the fuel injector in the internal combustion engine, as seen in FIG. 2B, the arrow "PLUG" and the arrow "PISTON" show the preferred injector orientation. Herein, a line K is a line which passes through the fuel injection hole 8 and is parallel to the cut-off face A1, and a line M is a line which passes through the fuel injection hole 8 and is orthogonal to the line K. The arrow "PLUG" and the arrow "PISTON" are parallel to the line M.

In the above-stated structure, the term "cut-off" which refers to the cut-off faces A1, A2 is not limited as to the processing manner in which the faces are formed, but merely refers to a shape in which a part thereof is removed; as a result, the invention is not limited to a body in which cutting processing is used to cut off a portion of the nozzle member 7. Namely, press processing (the deformation processing) using a die member and a processing of the casting and the like can be employed as well. This also applies to the following embodiments. Further, the ball member 6 is not required to have a spherical shape. Namely, the cone shape needle valve can be employed.

Further, as seen in FIG. 2A, in the fuel swirl element 22, an axial direction groove 25 and a radial direction groove 26 are provided. In this embodiment according to the present invention, the axial direction groove 25 is formed with a D-shaped cut face which is provided on an outer periphery of a substantially cylindrical fuel swirl element 22, but ring-shaped passages and the like can be employed as well.

The axial direction groove 25 and the radial direction groove 26 are the fuel passages in which fuel is introduced from a valve upper portion, and the fuel which has passed through the axial direction groove 25 is eccentrically introduced from the axial center in the radial direction groove 26. Namely the fuel is given a swirl movement and atomization of the fuel is promoted during the injection from the fuel injection hole which is provided in the nozzle member 7. Herein, the swirl strength (the swirl number S) given by the fuel swirl element 22 is indicated by a following formula.

$$S = \text{(angle move amount)}/\text{(move amount in fuel injection axial direction)} \times \text{(orifice radius)} = (2 \times d0 \times Ls)/(n \times dS^2 \times \cos(\theta/2)) \qquad \text{[formula 1]}$$

Herein,
  d0: fuel injection hole diameter
  Ls: groove eccentric amount (distance between valve axial center and groove (width) center)
  n: groove number of fuel swirl element
  θ: valve seat angle
  ds: $2 \times w \times h/w + h$ (hydraulic equivalent diameter, expressed by using groove width w and groove height h)

When the swirl number S is large, the atomization is promoted and the spray is dispersed. In this embodiment according to the present invention, the fuel injection hole 8 is provided in parallel with the valve body axial line J; however, but the fuel injection hole 8 can be inclined to the valve body axial line, and a flat spray still can be produced.

The operation of this fuel injector 1 constituted as described above will be explained. In the fuel injector 1, according to the electric ON-OFF signal supplied to the electromagnetic coil 14, the valve body 40 is moved upwardly and downwardly in the axial direction opening and closing the gap between the ball member 6 and the valve seat 9, and, accordingly, the injection control of the fuel is carried out. In this regard, when the electric signal is given to the coil 14, a magnetic circuit is formed with the core 2, the yoke 3 and the anchor 4 and then the anchor 4 is attracted toward the core 2. When the anchor 4 is moved, the ball member 6 formed as one body with the anchor 4 is moved and is separated from the seat face 9 of the valve seat of the nozzle member 7 and the fuel injection hole 8 is opened.

The fuel that is supplied under pressure to the interior portion of the fuel injector 1 through the filter 24 flows along a passage 11 into the cavity portion 5A provided in the interior of the core 2 after passing around the outer peripheral portion of the anchor 4 and then passes through the outflow port 5B. The fuel passes through a gap formed between the stopper 19 and the rod 5, and then it continues on a path that includes the axial direction fuel passage 25 of the fuel swirl element 22 and a swirl groove 30, from which it is swirl-supplied to the seat portion, and during the valve opening operation the fuel is injected from the fuel injection hole 8.

Next, using FIG. 3A, FIG. 3B and FIG. 3C, the spray structure obtained by the injector of this embodiment will be explained.

FIG. 3A shows the spray in a case in which, in the fuel injector of this embodiment, the fuel is injected to the atmosphere; and FIG. 3B shows a lateral cross-sectional view in which the spray in a cross-section X—X of FIG. 3A is viewed from the direction of arrow N; and FIG. 3C shows schematically the manner in which the fuel is directly injected into the combustion chamber (the cylinder) of an internal combustion engine.

As shown in FIG. 3A, the spray which is injected from the fuel injector 1 of this embodiment according to the present invention is deflected away from the center indicated by the arrow N in the direction of the arrow "PLUG" with a deflection angle of β, so that the mixture of fuel and air is richer toward the PLUG side, and on the "PISTON" side, the mixture has a combustible concentration which is lessened. Thus, in the region 80, the deflection of the spray is such that the "PLUG" side spray angle of $\alpha 1$ is larger than the "PISTON" side spray angle of $\alpha 2$.

Namely, in this embodiment according to the present invention, the inclination angles of the two faces which constitute the V groove are not the same, so that the opening degree of the constriction of the fuel passage is non-symmetric relative to the axial line J shown in FIG. 2A, and the spray fuel amount is larger at the larger inclination face angle, and at the smaller inclination face angle side, the spray flow amount is made small, as the spray is deflected. Namely, the inclination angle a1 of the V groove type cut-off face is set larger than the inclination angle a2, so that a spray which is deflected to the V groove type cut-off face A2 side can be generated. Herein, the deflection angle β is indicated by a following formula.

$$\beta=(\alpha 1-\alpha 2)/2 \quad \text{[formula 2]}$$

Further, as shown in FIG. 3B, the spray lateral cross-section of the spray is guided by the V type groove G1 so as to be diffused, and further, it is flatten (prolonged) in the direction of arrow R. Accordingly, a distribution having an area 80A is formed, namely, to the "PLUG" side there is a mixture of fuel and air having a large combustible concentration and at the arrow "PISTON" side there is a mixture of fuel and air having a small combustible concentration.

Further, when the fuel injector 1 of this embodiment according to the present invention is installed with an installation angle of γ and oriented in relation to the direction of the arrow "PLUG" and the direction of the arrow "PISTON", as shown in FIG. 3C, in the internal combustion engine 60, the mixture of fuel and air is injected so as to be received in a cavity 69A of a piston 69, which is arranged to reciprocate in a cylinder 68; and, at the ignition apparatus 65 side, the combustible mixture of fuel and air is formed to be comparatively large, and at the piston 69 side, the combustible mixture of fuel and air is formed to be comparatively thin, to provide distribution area 80.

Further, in FIG. 3C, in the combustion chamber 67, the flow of the gaseous body, except for the spray, does not exist, and the pressure in the cylinder is substantially the same as the atmospheric pressure. Further, in this embodiment according to the present invention, the spray particle diameter is extremely small due to the atomization imparted by the swirl force to the fuel as produced by the fuel swirl element 22, which is provided in the nozzle member 7.

In general, between the diameter d0 and the orifice length L' of the fuel injection hole 8, the spray angles $\alpha 1$ and $\alpha 2$, relative to the diameter d0 of the fuel injection hole 8 when the orifice length L' is large, namely when the ratio of L'/d0 is large, there is a tendency for the spray angles $\alpha 1$ and $\alpha 2$ to become small.

Further, when the inclination angles a1 and a2 of the inclined surfaces A1 and A2 are small, there is a tendency for the spray angles $\alpha 1$ and $\alpha 2$ to be small. As a result, for an installation angle of (10°–50°) of the fuel injector, to obtain desirable spray angles $\alpha 1$ and $\alpha 2$, the orifice length L' of the V groove shaped cut-off portion can be adjusted according to the diameter d0, and the inclination angles a1 and a2.

Figure 4A:
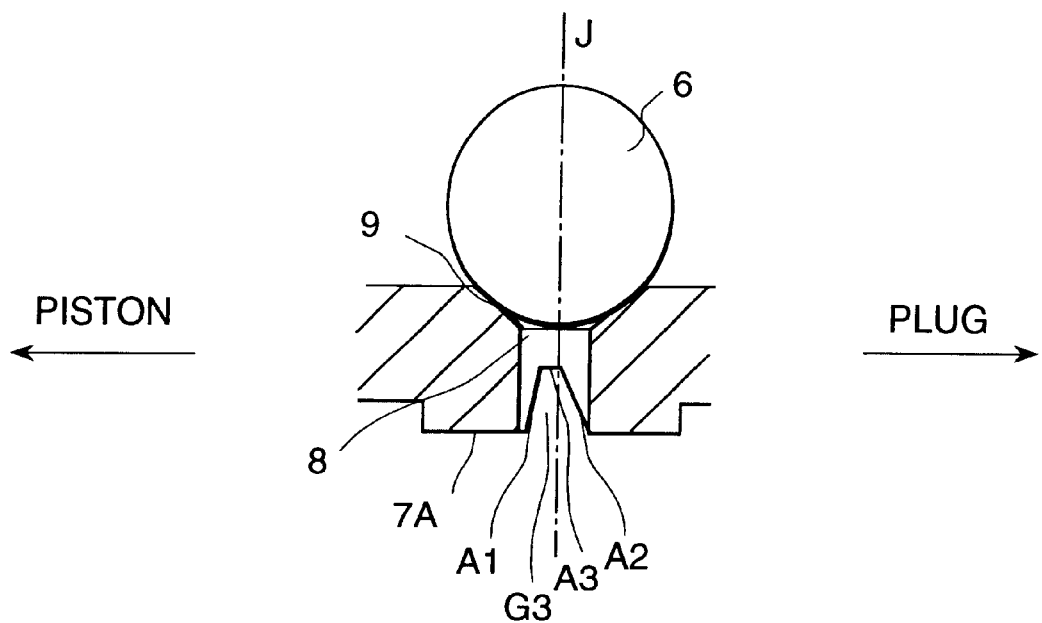
FIG. 4A is a diagram showing a nozzle portion of the electromagnetic system fuel injector explained with reference to the embodiments of FIG. 1 to FIG. 3B.
Figure 4B:
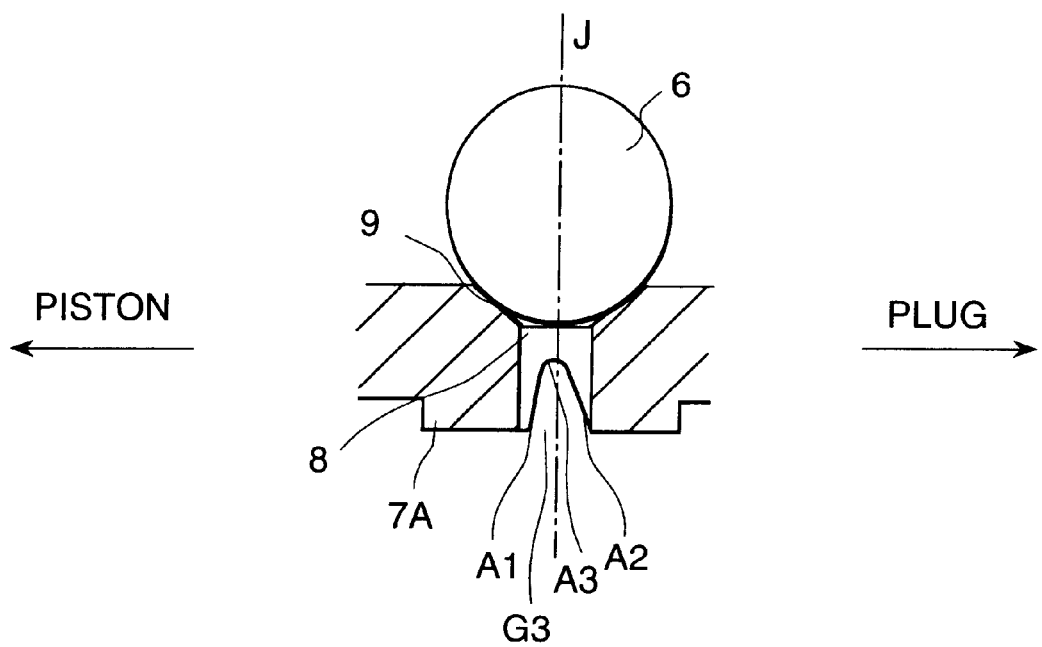
FIG. 4B is a diagram showing another nozzle portion of the electromagnetic system fuel injector represented by the embodiments of FIG. 1 to FIG. 3B.

Further, the V-type groove G2 can be formed with a shape such as shown in FIG. 4A, which is a section through the valve body along the axial line J, so that a third substantially transverse face A3 is included. Further, this transverse face A3 can be formed also as a two dimensional curved face, as shown in FIG. 4B. As a result, a substantial V groove G3 is formed.

Figure 5A:
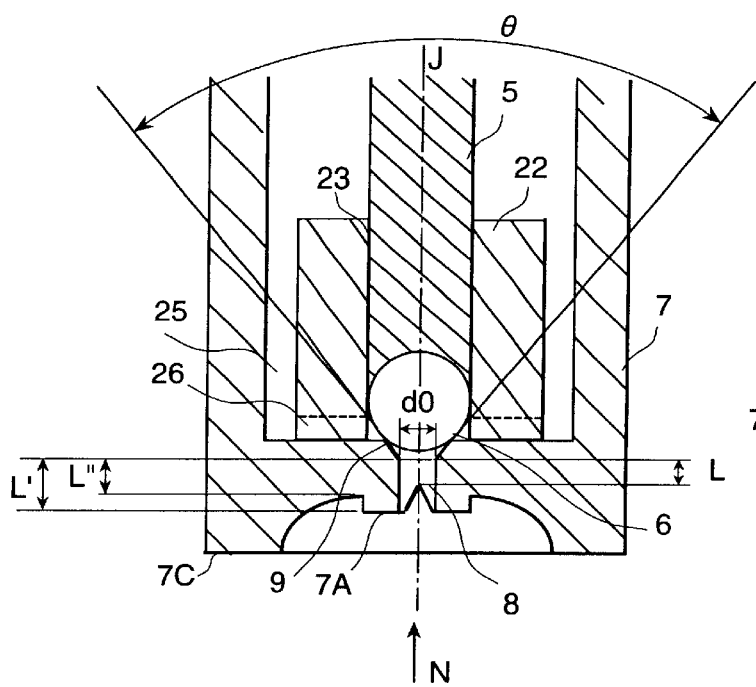
FIG. 5A is an enlarged longitudinal sectional view showing a nozzle portion of the electromagnetic system fuel injector of the embodiments shown in FIG. 1 to FIG. 3B.
Figure 5C:
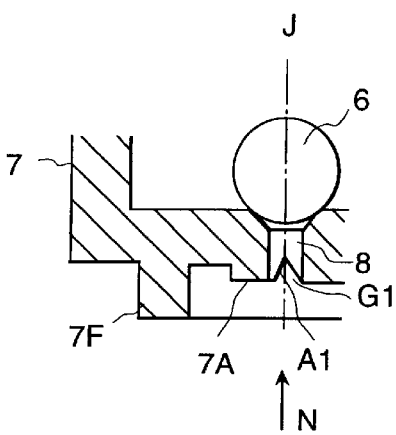
FIG. 5C is a longitudinal cross-sectional view of another nozzle member.
Figure 5B:
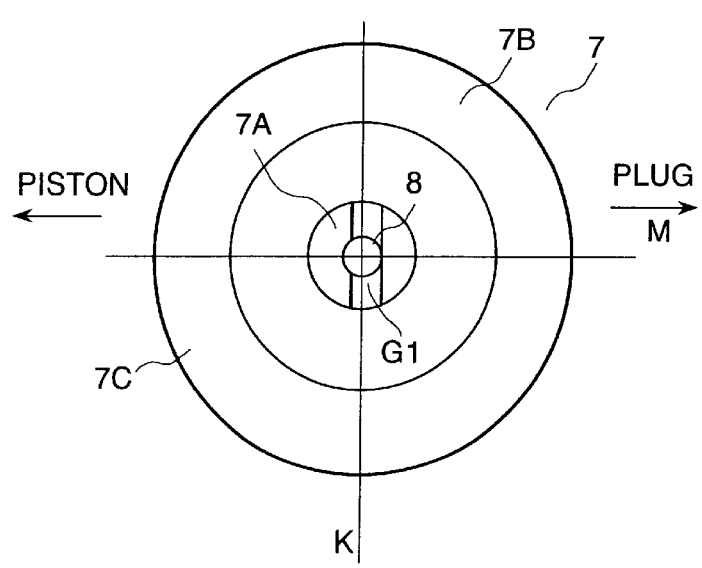
FIG. 5B is a plan view of the nozzle portion.
Figure 5D:
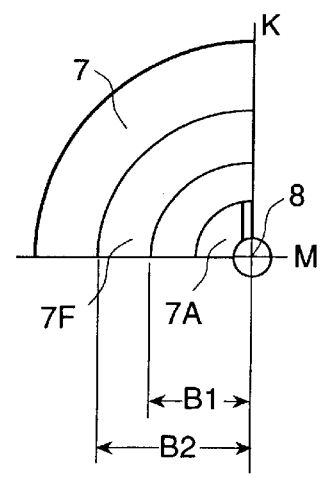
FIG. 5D a plan view of another nozzle portion.

Further, the nozzle member 7 of the electromagnetic fuel injector 1 can be constituted to have constructions as shown in FIG. 5A and FIG. 5C. FIGS. 5A and 5C show an enlarged sectional views of the nozzle member 7 of the electromagnetic fuel injector 1. FIG. 5B and FIG. 5D are plan views of the nozzle member 7 shown FIG. 5A and FIG. 5D, respectively, as viewed from the arrow N direction.

The main difference between the nozzle member 7 of the electromagnetic fuel injector 1 shown in FIG. 5A and FIG. 5B and the nozzle member 7 of the electromagnetic fuel injector 1 shown in FIG. 2A and FIG. 2B is that at an outer peripheral portion of the bottom face of the nozzle member 7 is provided with a thick portion 7C.

Namely, according to this construction, by provision of the thick portion 7C, the vibration noises during the seating operation of the ball member 6 against the seat face 9 can be reduced. Further, in the arrangement shown in FIG. 5C and FIG. 5D according to the provision of the distance B1—from the center of the injection hole 8, and according to a substantially ring shape thick portion 7F having a thickness (B2–B1), reduction of the vibration noise can be achieved.

Figure 6A:
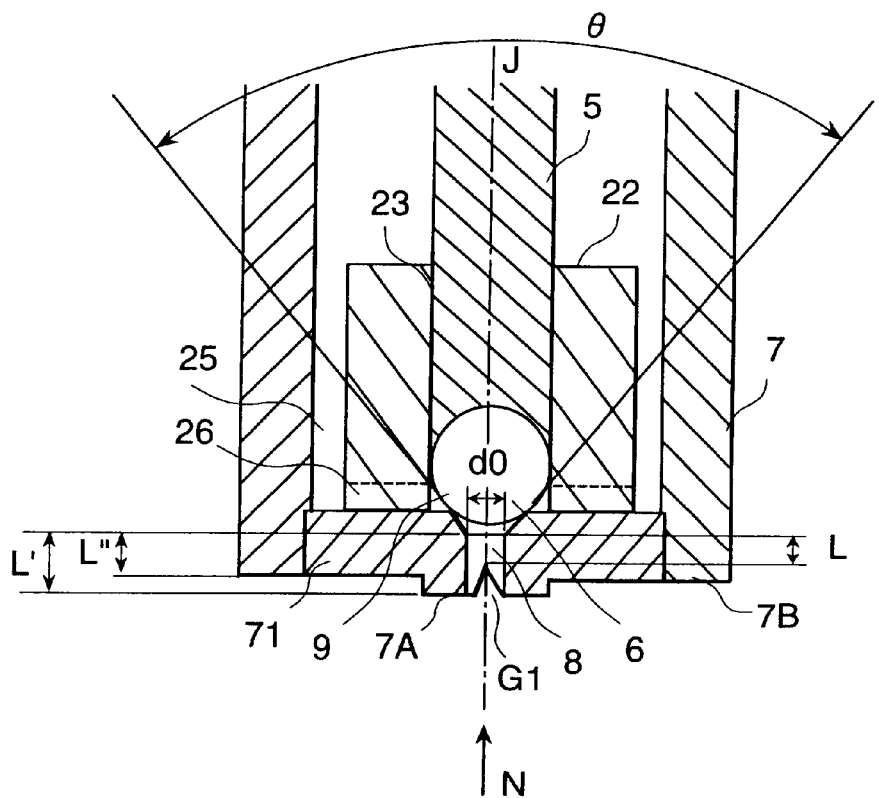
FIG. 6A is an enlarged longitudinal sectional view showing a nozzle portion of the electromagnetic system fuel injector of the embodiments shown in FIG. 1 to FIG. 3.
Figure 6B:
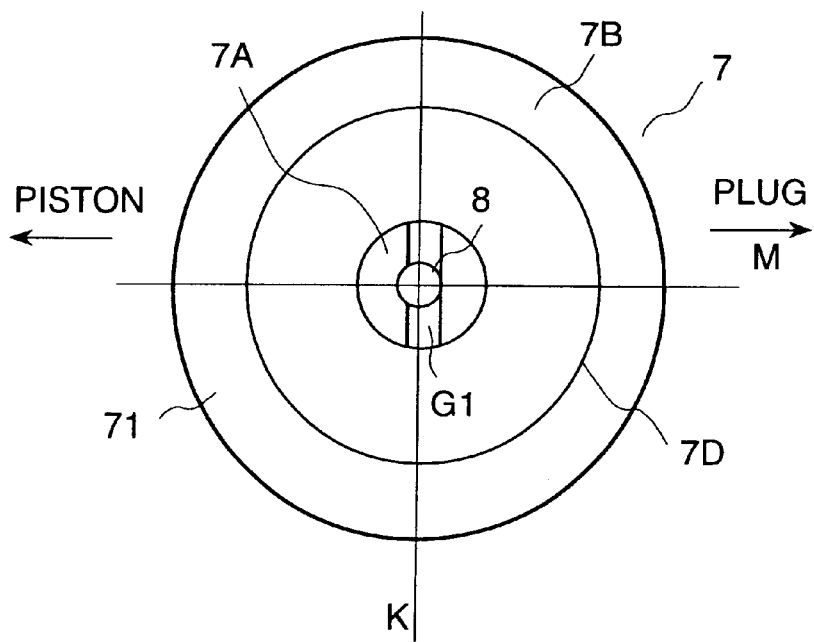
FIG. 6B is a plan view of the nozzle portion.

Further, the nozzle member 7 of the electromagnetic fuel injector 1 can be constituted to have a construction as shown in FIG. 6A and FIG. 6B. FIG. 6A shows an enlarged sectional view of the nozzle member 7 of the electromagnetic fuel injector 1, and FIG. 6B is a plan view of the nozzle member 7 of FIG. 6A as seen from the direction of arrow N.

The main difference between the nozzle member 7 of the electromagnetic fuel injector 1 shown in FIG. 6A and the nozzle member 7 of the electromagnetic fuel injector 1 shown in FIG. 2A and FIG. 2B is that a bottom face of the nozzle member 7 is constituted from a nozzle bottom portion 71, which is welded to the cylindrical portion of the nozzle member 7 along a joining portion 7D. Namely, with this construction, parts which can be altered suitably according to the volume of the engine and the installation angle of the fuel injector can be assembled only on the nozzle bottom portion 71, thereby significantly improving the productivity.

Referring to FIG. 7A, FIG. 7B, FIG. 8A and FIG. 8B, another embodiment according to the present invention will be explained.

FIG. 7A shows an enlarged sectional view of the nozzle member 7 of the electromagnetic fuel injector 1, and FIG. 7B is a plan view of FIG. 7A of the nozzle member 7 as seen from the direction of arrow N.

The main difference between this embodiment according to the present invention and the embodiments shown in FIG. 1 to FIG. 6B is that in place of the V groove type cut-off faces A1 and A2, a step-wise rectangular type groove G4, which is constituted of faces B1, B2 and B3 disposed in parallel or substantially in parallel to the axial line J relative to the outlet portion of the fuel injection hole 8 and faces B4 and B5 disposed to be orthogonal to the axial line J, is formed. Namely, in this embodiment according to the present invention, since the wall face of the fuel injection hole 8 which restricts the flow of the fuel is given a rectangular form, the opening degree against the fuel flow is strengthened.

Accordingly, this is effective to generate a spray having a strong flat pattern. Further, to promote the diffusion and the dispersion of the spray, it is effective to form a comparatively solid cone spray. Further, when a comparatively solid cone spray is generated, it is possible to generate a spray which is hardly affected by the fluctuation of the pressure in the cylinder, and, as a result, the spray spreading angle and the spray reaching distance can be adjusted. As to the spray particle diameter, the same effect as that achieved by the first embodiment according to the present invention can be obtained.

Further, since the orifice length L''' of the step-wise rectangular shaped groove G4 is larger than the orifice length L, it is possible to deflect the spray toward the "PLUG" side. The other structural features of the construction are same as those of the first embodiment according to the present invention. Further, as shown in FIG. 7B, it can constitute a construction in which the "PLUG" side of the projection portion 7A is cut off by an amount (L'-L''').

In this embodiment according to the present invention, the considerations concerning the orifice lengths L, L' and L" are same as the above stated embodiments.

Next, referring to FIG. 8A and FIG. 8B, the spray structure of this embodiment according to the present invention will be explained.

Figure 8A:
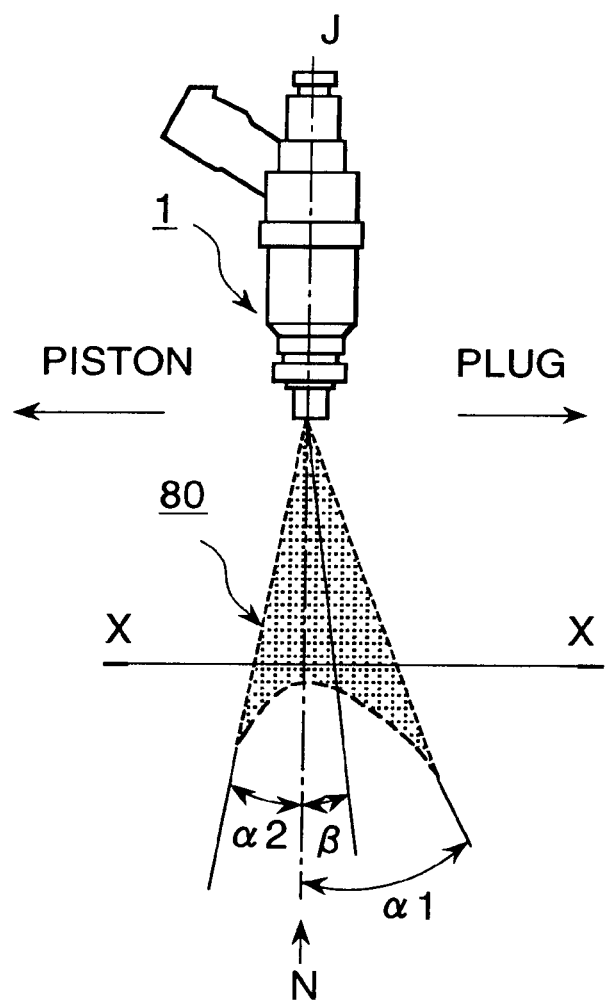
FIG. 8A is a diagram showing how a change of an orifice edge of a fuel injector in a face which is orthogonal to an axial line of the fuel injector of FIG. 7A affects a cross-sectional structure.
Figure 8B:
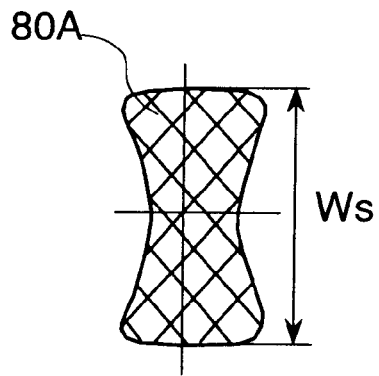
FIG. 8B is a view as seen in the direction of arrow N in a cross-section X—X of FIG. 8A.

FIG. 8A shows the spray in a case where the fuel injector of this embodiment according to the present invention injects the fuel in the atmosphere, and FIG. 8B shows schematically the lateral cross-sectional view as seen from the direction of arrow R of the spray in a cross-section X—X of FIG. 8A.

With the fuel injector of this embodiment according to the present invention, a flat defection spray similar to that shown in FIG. 3A and FIG. 3B can be obtained as a result of the provision of the step-wise rectangular shape groove G4; and, in the spray, the opening degree of the fuel is strengthened, thereby to promote a diffusion and dispersion of the spray, so that a comparatively solid cone spray shape can be obtained.

Further, since the spray is diffused by being guided by the rectangular groove, as shown in FIG. 8B, the distribution of an area 80A having a substantially rectangular or drum shape having a length of Ws can be obtained. The face of the fuel injection hole is constituted by one deflection face, from which it is possible to realize a spray having a low convergence and which is highly homogenous.

Figure 9A:
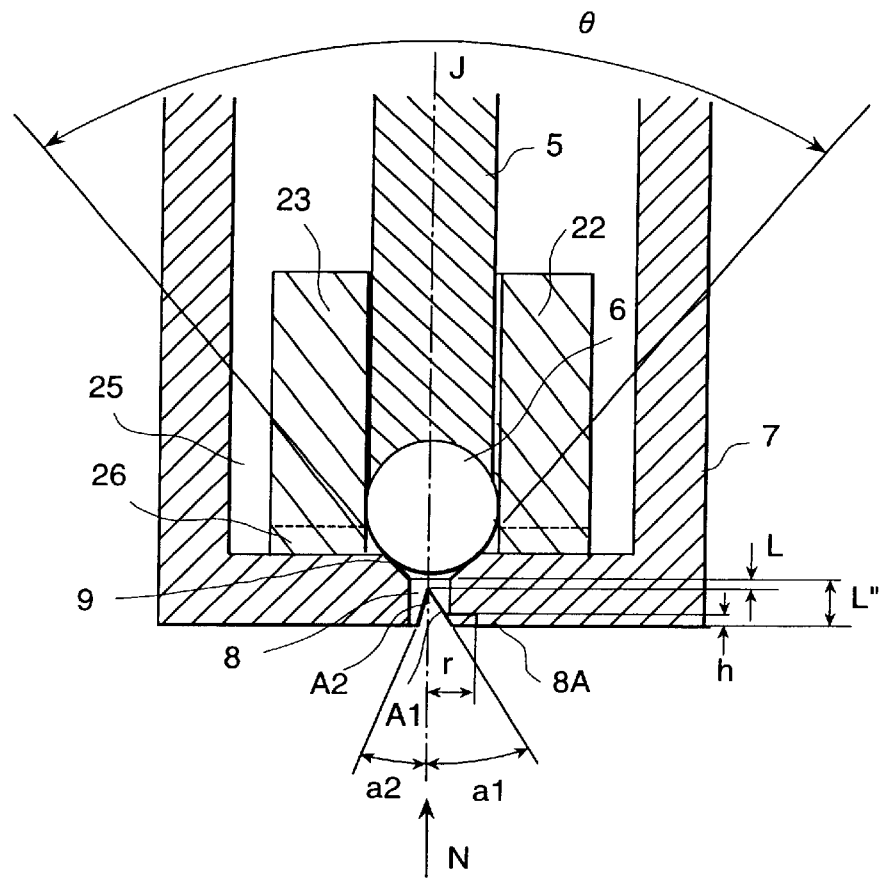
FIG. 9A is a cross-sectional view showing an electromagnetic system fuel injector representing a further embodiment according to the present invention.
Figure 9B:
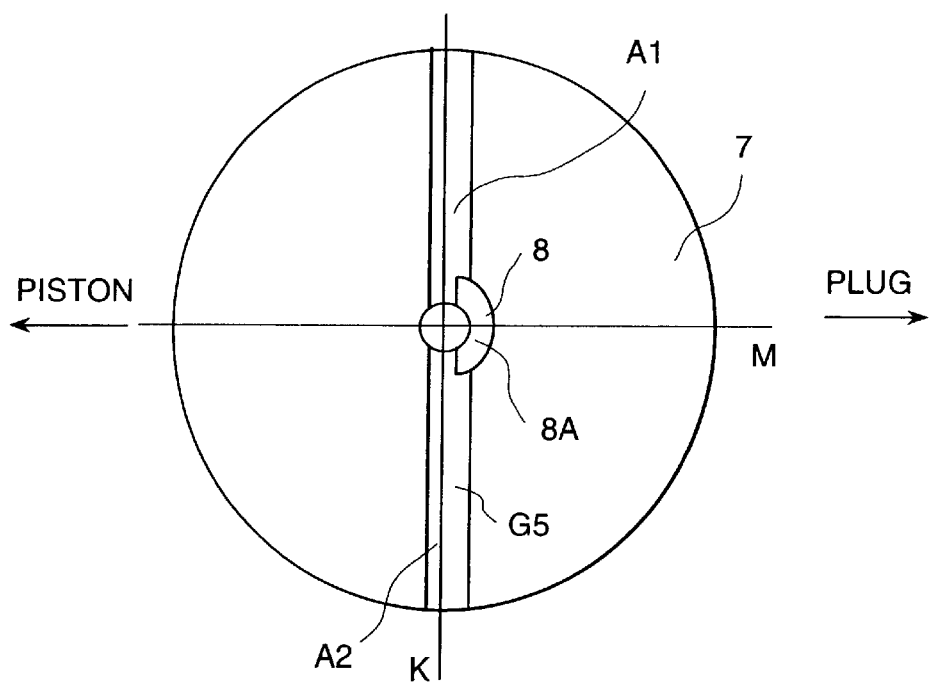
FIG. 9B is a plan view of the nozzle portion.

Referring to FIGS. 9A and 9B, another embodiment according to the present invention will be explained.

The main difference between this embodiment according to the present invention and the above-stated embodiment is that, in addition to the V groove type cut-off face A1, a second office which is defined by a radius r and a depth d is formed. Namely, in this embodiment according to the present invention, in addition to V type groove G5, since the wall face of the fuel injection hole 8 which restricts the flow of the fuel is removed with a cylindrical form, the opening degree relative to the fuel flow is strengthened. Other structural features of this construction are the same as those of the first embodiment according to the present invention.

In this embodiment according to the present invention, since the spray cross-section which is guided to the second orifice 8A side is diffused in a substantially semi-circular shape, it is possible to generate a spray having a large deflection degree. As to the spray shape and the spray particle diameter, the effects are the same as those of the first embodiment according to the present invention. In addition, the consideration concerning the orifice lengths L' and L" are same as in the above-stated embodiments.

Figure 10A:
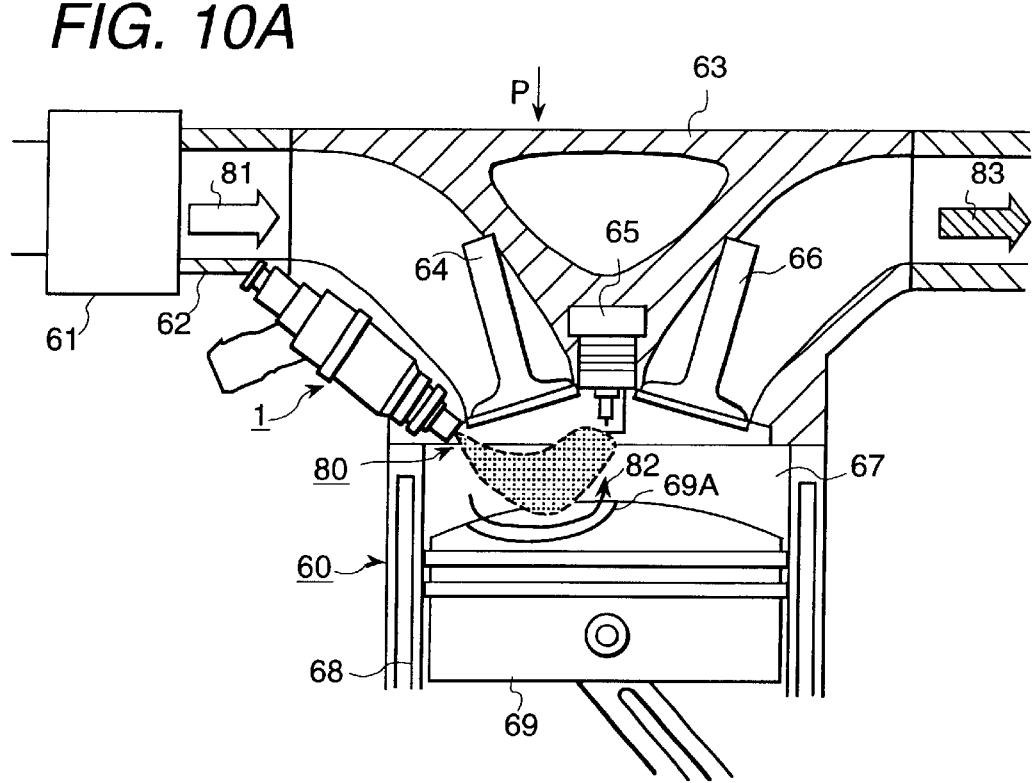
FIG. 10A is a cross-sectional view of a gasoline direct injection engine in which the electromagnetic system fuel injection according to the present invention is mounted.
Figure 10B:
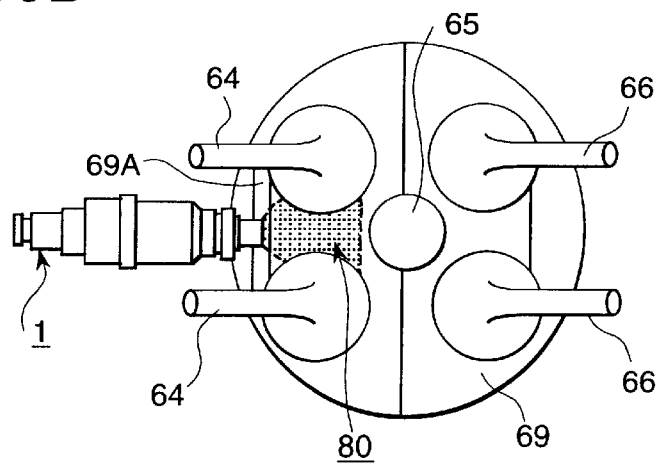
FIG. 10B is a top view of a combustion chamber as seen in the direction of arrow P in FIG. 10A.
Figure 10C:
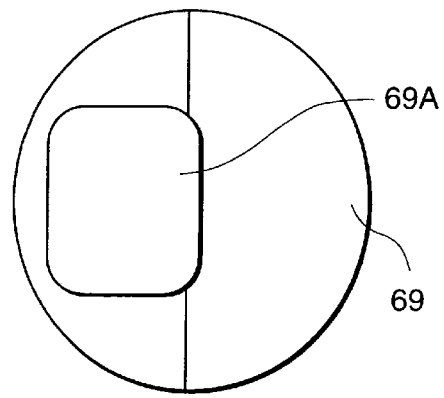
FIG. 10C is a view of a piston head as seen in the direction of arrow P in FIG. 10A.

FIG. 10A is a longitudinal sectional view showing an embodiment of an internal combustion engine in which the fuel injector according to the present invention is mounted; FIG. 10B is a top view of a combustion chamber as seen from the direction of arrow P in FIG. 10A; and, FIG. 10C is a schematic view of a piston head as seen from above.

A piston 69 which is arranged to reciprocate in a cylinder 68 is moved upwardly and downwardly in the cylinder 68 in response to the rotation of a crank shaft (not shown in the figure). To an upper portion of the cylinder 68, a cylinder head 63 is installed, and this cylinder head 63 forms an enclosed space together with the cylinder 68.

On the cylinder head 63, an air intake manifold 62 is installed for introducing air into the cylinder 68 through an air intake amount controlling apparatus 61 in which a throttle valve is installed, and an air exhaust manifold is also provided for exhausting a combustion gas which is the result of combustion in the cylinder 68.

In the cylinder head 63, on the air intake manifold 62 side, an air intake valve 64 is provided, at a center portion, an ignition apparatus 65 is provided, and at the opposite side of a spark plug 65 relative to the air intake valve 64, an air exhaust valve 66 is provided. The air intake valve 64 and the air exhaust valve 66 are provided to extend into the combustion chamber 67. A blank arrow 81 in FIG. 10A shows the direction of flow of the intake air, and a hatched arrow 83 shows the direction of flow of the exhaust air.

Herein, the fuel injector 1 is installed in the vicinity of the air intake manifold 62 in the cylinder head 63, and the axis of the fuel injector 1 is set to have a little downward direction toward the combustion chamber 67. In general, the installation angle γ of the injector is 10–50 degree. As seen in FIG. 10C, the piston 69, a cavity 69A (a recessed portion) which is provided in the upper surface thereof. The fuel injection hole of the fuel injector 1 is directed toward the cavity 69A which is provided in the piston 69.

The fuel in the internal combustion engine 60 is supplied directly to the combustion chamber 67 by the fuel injector according to an air intake amount and timing, so that immediately before the spark is generated by the plug 65, the fuel is distributed in a pattern 80. The fuel which has been atomized in the process of the injection is promoted to form a mixture of the injected fuel and the air flow (the swirl flow) 82 which is supplied through the air intake manifold 62 into the combustion chamber 67, and these streams converge in the cavity 69A.

As to the distribution state of the spray, since the mixture of fuel and air has a large combustible concentration in the vicinity of the ignition apparatus 65, but has a small concentration in the vicinity of the cavity 69A, the mixture of fuel and air is not applied excessively to the piston 69. The mixture of fuel and air thereafter is compressed during a compression stroke of the piston 69, and a spark is stably generated by the ignition apparatus 65, with the result that a stable combustion can be realized in which the discharge amount of unburned gas is restrained.

The above-stated gasoline direct injection engine 60 generates an air intake swirl in the combustion chamber 67, and without any significant alteration of the cylinder head 63 of the conventional engine, a thin combustion can be realized.

Further, the fuel injector 1 of the foregoing embodiments according to the present invention can be implemented simply by cutting off a part of the wall face which forms the injection hole at the outlet portion of the fuel injection hole, or the injection hole length of the fuel injection hole can be varied in the circumferential direction of the fuel injection hole by providing a step-wise groove at the outlet opening portion of the fuel injection hole. In the alternative, the desired configuration can be obtained by forming the recessed portion to the nozzle tip end face, including the wall face which forms the fuel injection hole.

From another standpoint, regarding these embodiments according to the present invention, the part of the wall face which forms the fuel injection hole can be provided to extend in the downstream side (the tip end side of the nozzle member) from other parts.

Figure 11A:
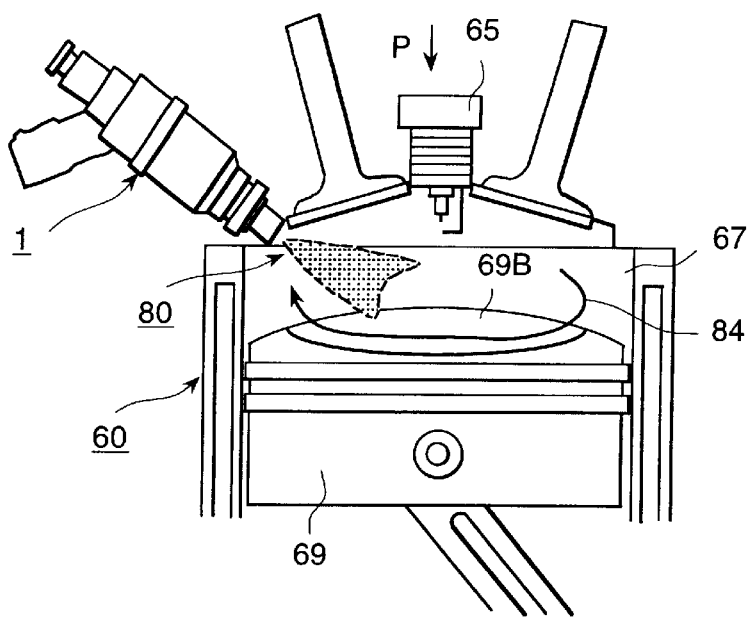
FIG. 11A is a cross-sectional view of the gasoline direct injection engine representing another embodiment of the present invention.
Figure 11B:
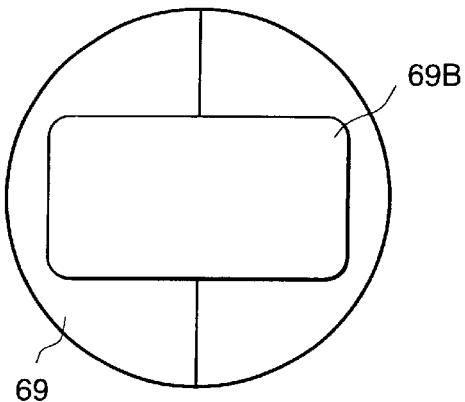
FIG. 11B is a view of a piston head as seen in the direction of arrow P in FIG. 11A.

Further, the internal combustion engine on which the fuel injector according to the present invention is mounted can be constituted as shown in FIG. 11A. FIG. 11A is a longitudinal sectional view showing an embodiment of an internal combustion engine in which the fuel injector according to the present invention is mounted, and FIG. 11B is a schematic view of a piston head as seen from the direction of arrow P in FIG. 11A.

The main difference between the internal combustion engine 60 shown in FIG. 11 and the internal combustion engine in FIGS. 10A and 10C is that a cavity 69B for carrying out the mixture of fuel and air using a tumble flow 84 is provided. Namely, in this construction, as a result of the tumble flow induced by the cavity 69B, it is possible to transfer the mixture of fuel and air 80 having a large combustible concentration to the ignition apparatus 65.

Figure 12:
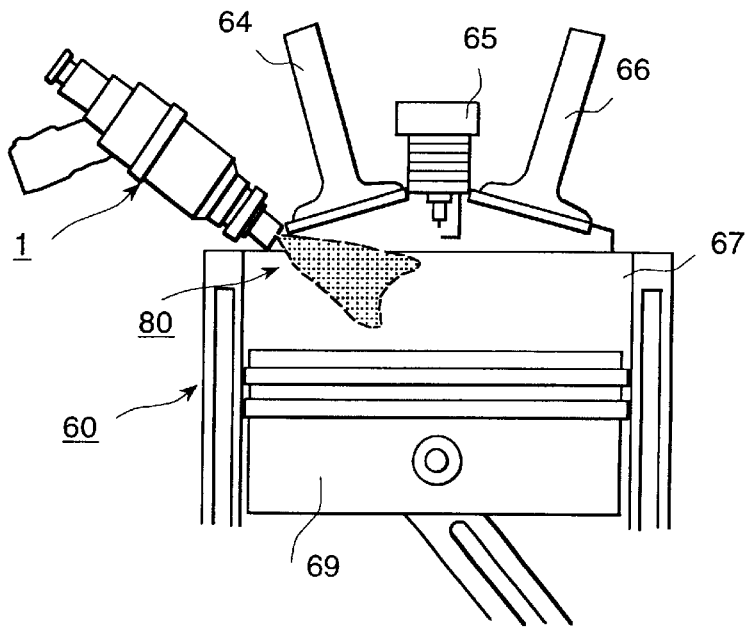
FIG. 12 is a cross-sectional view of the gasoline direct injection engine representing a further embodiment of the present invention.

Further, the internal combustion engine on which the fuel injector according to the present invention is mounted can be constituted as shown in FIG. 12. FIG. 12 is a longitudinal sectional view showing an embodiment of an internal combustion engine in which the fuel injector according the present invention is mounted.

The main difference between the internal combustion engine 60 shown in FIG. 12 and the internal combustion engine illustrated in FIG. 10A is that a flat piston 69 having no cavity for inducing the in-cylinder flow of the swirl flow 82 and the tumble flow 84 and the like is provided. Namely, in this embodiment according to the present invention, by adjusting the orifice lengths of L, L', L", the diameter of the fuel injection hole d0, and the distances W1, W2, W3, as explained with reference to FIGS. 2A, 2B and FIGS. 3A–3C, suitable spray angles $\alpha 1$, $\alpha 2$ and $\beta$ can be set, without the use of the swirl flow or the tumble flow; or, with a comparatively weak swirl or tumble, it is possible to cause the mixture of fuel and air 80 having a large combustible concentration to reach the ignition apparatus 65.

According to the present invention, a center axial line of the fuel injection hole and further a flat face in parallel to the center axial line of the fuel injector are set as boundaries; and, at one side of the boundary, a large spray amount is formed, and at the other side of the boundary, a small spray amount is formed. In addition, the spray angle is large in a direction in parallel to the flat face and the spray angle is small in a direction vertical to the flat face, so that a flat inclined spray is formed.

What is claimed is:

1. A fuel injector having an injection hole, a valve seat arranged at an upstream end of said injection hole, a swirl passage for imparting a swirl force to fuel at an upstream side of said valve seat, a valve body for carrying out an opening operation and a closing operation of a fuel passage at said valve seat, and driving means for driving said valve body in an axial direction thereof, wherein at an outlet portion of said injection hole, a part of the wall face forming said injection hole is cutoff so as to have a groove shape.

2. A fuel injector having an injection hole, a valve seat arranged at an upstream end of said injection hole, a swirl passage for imparting a swirl force to fuel at an upstream side of said valve seat, a valve body for carrying out an opening operation and a closing operation of a fuel passage at said valve seat, and driving means for driving said valve body in an axial direction thereof, wherein at a nozzle tip end face on which an outlet opening face of said injection hole is formed, a groove extending on both sides of said outlet opening is formed in said outlet opening face, and the respective distances from a center axial line of said injection hole to each of the side walls forming said groove are different.

3. A fuel injector having an injection hole, a valve seat arranged at an upstream end of said injection hole, a swirl passage for imparting a swirl force to fuel at an upstream side of said valve seat, a valve body for carrying out an opening operation and a closing operation of a fuel passage at said valve seat, and driving means for driving said valve body in an axial direction thereof, wherein a V groove is formed with two faces which are inclined at optional angles relative to a center axial line of said injection hole.

4. A fuel injector having an injection hole, a valve seat arranged at an upstream end of said injection hole, a swirl passage for imparting a swirl force to fuel at an upstream side of said valve seat, a valve body for carrying out an opening operation and a closing operation of a fuel passage at said valve seat, and driving means for driving said valve body in an axial direction thereof, wherein a groove-shaped cut-off face is formed by a substantially recess-shaped step-wise groove having different cut-off depths.

5. In a fuel injection apparatus having a fuel injector for injecting fuel directly into a cylinder, a pump for supplying the fuel to said fuel injector by pressurizing the fuel, and a control apparatus for controlling said fuel injector to control fuel injection, said fuel injector having an injection hole, a valve seat arranged at an upstream end of said injection hole, a swirl passage for imparting a swirl force to fuel at an upstream side of said valve seat, a valve body for carrying out an opening operation and a closing operation of a fuel passage at said valve seat, and driving means for driving said valve body in an axial direction thereof, wherein at a nozzle tip end face on which an outlet opening face of said injection hole is formed, a groove extending on both sides of said outlet opening is formed in said outlet opening face, and the respective distances from a center axial line of said injection hole to each of the side walls forming said groove are different.

6. In an internal combustion engine having a cylinder, a piston which reciprocates in said cylinder, an air intake means for introducing air into said cylinder, an air exhaust means for exhausting combustion gas from said cylinder, a fuel injector for injecting fuel directly into said cylinder, a fuel supply means for supplying fuel to said fuel injector from a fuel tank, a piston in said cylinder and having a cavity for catching a mixture of air introduced into said cylinder from said air intake means and fuel injected into said cylinder by said fuel injector, and an ignition apparatus for igniting said mixture of fuel and air, said fuel injector having an injection hole, a valve seat arranged at an upstream end of said injection hole, a swirl passage for imparting a swirl force to fuel at an upstream side of said valve seat, a valve body for carrying out an opening operation and a closing operation of a fuel passage at said valve seat, and driving means for driving said valve body to in axial direction thereof, wherein at an outlet portion of said injection hole, a part of the wall face for forming said injection hole is cut off so as to have a groove shape.

7. In an internal combustion engine having a cylinder, a piston which reciprocates in said cylinder, an air intake means for introducing air into said cylinder, an air exhaust means for exhausting combustion gas from said cylinder, a fuel injector for injecting fuel directly into said cylinder, a fuel supply means for supplying fuel to said fuel injector from a fuel tank, a piston in said cylinder and having a cavity for catching a mixture of air introduced into said cylinder from said intake air means and fuel injected into said cylinder by said fuel injector, and an ignition apparatus for igniting said mixture of fuel and air, said fuel injector having an injection hole, a valve seat arranged at an upstream end of said injection hole, a swirl passage for imparting a swirl force to fuel at an upstream side of said valve seat, a valve body for carrying out an opening operation and a closing operation of a fuel passage at said valve seat, and driving means for driving said valve body in an axial direction thereof, wherein a part of a wall face for forming said injection hole at an outlet portion of said injection hole is formed with a substantially recess-shaped step-wise rectangular groove having different cut-off depths, and a side where said cut-off depth of a face of said step-wise groove is large is directed toward said ignition apparatus and a side where said cut-off depth of said face of said step-wise groove is small is directed toward said piston.

8. In an internal combustion engine according to claim 6 or claim 7, wherein:

a flat inclined spray is produced by said fuel infector such that in the vicinity of said ignition apparatus, the spray concentration is high, and in the vicinity of said piston, the spray concentration is formed thin; and by converging said flat inclined spray to said cavity, said flat inclined spray is induced toward said ignition apparatus.

* * * * *